US008861951B2

(12) United States Patent
Warren et al.

(10) Patent No.: US 8,861,951 B2
(45) Date of Patent: Oct. 14, 2014

(54) TWO PART CAMERA MODULE

(75) Inventors: Gary Warren, Aurora (CA); Darren Van Roon, Bowmanville (CA); Steve Steane, Courtice (CA); Reginald C. Grills, Oshawa (CA)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/436,470

(22) Filed: Mar. 30, 2012

(65) Prior Publication Data

US 2013/0142504 A1 Jun. 6, 2013

Related U.S. Application Data

(60) Provisional application No. 61/567,082, filed on Dec. 5, 2011.

(51) Int. Cl.
G03B 17/02 (2006.01)

(52) U.S. Cl.
USPC .......................................... 396/541; 348/373

(58) Field of Classification Search
USPC ........................... 396/541, 535; 348/373–374
See application file for complete search history.

(56) References Cited

U.S. PATENT DOCUMENTS

| 5,530,499 A * | 6/1996 | Mori ................................. 396/29 |
| 6,665,455 B1 * | 12/2003 | Ting ................................ 382/312 |
| 6,711,354 B2 * | 3/2004 | Kameyama .................... 396/301 |
| 6,734,357 B2 * | 5/2004 | Kruke et al. ..................... 174/59 |
| 7,718,892 B2 * | 5/2010 | Warren et al. .................... 174/50 |
| 7,988,371 B2 * | 8/2011 | Aoki et al. ...................... 396/529 |
| 8,083,416 B2 * | 12/2011 | Scadden et al. .................. 385/75 |
| 8,480,315 B2 * | 7/2013 | Nakamura et al. ............. 396/419 |
| 2003/0095800 A1 | 5/2003 | Finizio et al. |
| 2004/0048507 A1 | 3/2004 | Hage |
| 2004/0169771 A1 * | 9/2004 | Washington et al. .......... 348/374 |
| 2005/0030722 A1 * | 2/2005 | Bohlin et al. ................... 361/732 |
| 2005/0070154 A1 * | 3/2005 | Milan ............................ 439/502 |
| 2005/0275725 A1 | 12/2005 | Olsson et al. |
| 2006/0139482 A1 * | 6/2006 | Sanz et al. ...................... 348/373 |
| 2006/0240715 A1 * | 10/2006 | Zueck et al. ................... 439/681 |
| 2007/0053681 A1 * | 3/2007 | Arbuckle ........................ 396/427 |
| 2008/0159734 A1 * | 7/2008 | Westerweck et al. .......... 396/541 |
| 2009/0252488 A1 * | 10/2009 | Eromaki et al. ............... 396/529 |
| 2009/0266606 A1 | 10/2009 | Kameyama |
| 2011/0249120 A1 * | 10/2011 | Bingle et al. .................. 348/148 |

FOREIGN PATENT DOCUMENTS

| GB | 2 433 172 | 6/2007 |
| WO | 2004/047421 | 6/2004 |

* cited by examiner

*Primary Examiner* — Christopher Mahoney
(74) *Attorney, Agent, or Firm* — Volpe and Koenig, P.C.

(57) ABSTRACT

Described herein is a two part camera module. A first part includes a lens assembly, a lens assembly holder, a printed circuit board (PCB) with an image capture device and a terminal block. The second part includes mounting elements, a connector shroud, an endcap, and an o-ring. The first part and the second part are configured to interconnect using a snap assembly. The first part is universal for all device applications and the second part is adaptable/interchangeable for each device application.

15 Claims, 6 Drawing Sheets

TWO PART CAMERA MODULE

CROSS REFERENCE TO RELATED APPLICATION

This application claims the benefit of U.S. Provisional Application No. 61/567,082, filed Dec. 5, 2011, the content of which is hereby incorporated by reference herein as if fully set forth.

FIELD OF INVENTION

This application is related to packaging of camera modules.

BACKGROUND

Camera modules may be used in a variety of applications and industries. As a result, there are a variety of camera modules that are specific to an application and/or industry. These camera modules are not universal or interchangeable. Most of these camera modules have metal parts and have complex assembly mechanisms that use screws and glue. The manufacturing of camera modules using reusable parts and designs may provide low cost effective solutions that may be used in many applications.

SUMMARY

Described herein is a two part camera module. A first part includes a lens assembly, a lens assembly holder, a printed circuit board (PCB) with an image capture device and a terminal block. The second part includes mounting elements, a connector shroud, an endcap, and an o-ring. The first part and the second part are configured to interconnect using a snap assembly. The first part is universal for all device applications and the second part is adaptable/interchangeable for each device application.

BRIEF DESCRIPTION OF THE DRAWINGS

A more detailed understanding may be had from the following description, given by way of example in conjunction with the accompanying drawings wherein.

DETAILED DESCRIPTION

Figure 1:
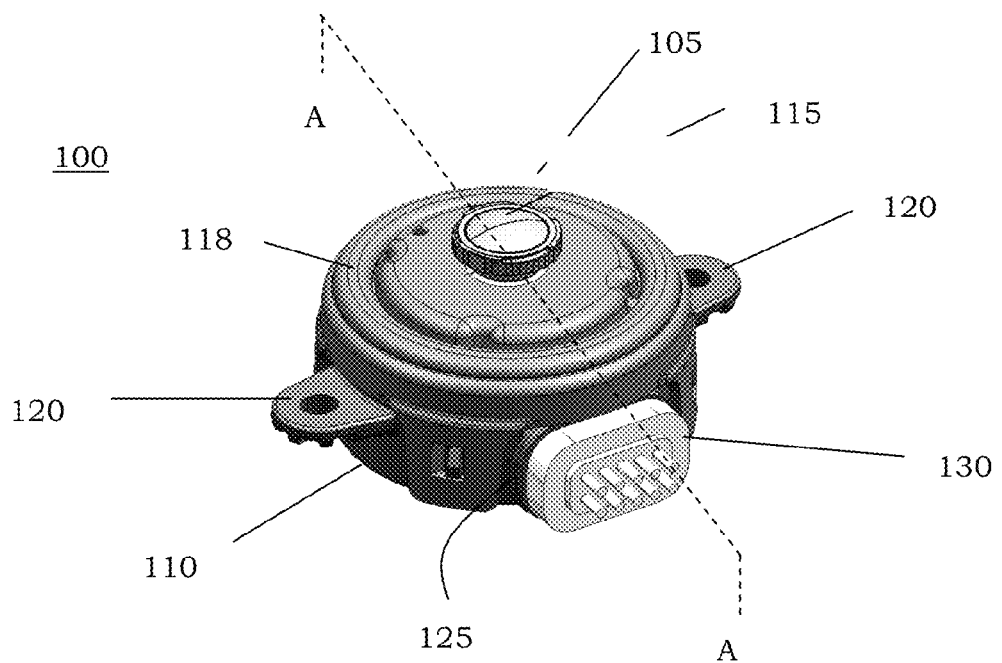
FIG. 1 is an embodiment of an assembled circular two part camera module.

It is to be understood that the figures and descriptions of embodiments of the camera module packaging have been simplified to illustrate elements that are relevant for a clear understanding, while eliminating, for the purpose of clarity, many other elements found in typical electronics packaging. Those of ordinary skill in the art may recognize that other elements and/or steps are desirable and/or required in implementing the camera module packaging. However, because such elements and steps are well known in the art, and because they do not facilitate a better understanding of the camera module packaging, a discussion of such elements and steps is not provided herein.

The non-limiting embodiments described herein are with respect to camera modules. The embodiments and variations described herein, and/or shown in the drawings, are presented by way of example only and are not limiting as to the scope and spirit. The camera modules may be used in a number of applications including automobile applications and other environmental exposure applications. Applicable parts may be made using known manufacturing methods including for example, thermoplastic molding techniques.

FIG. 1 shows an assembled circular two part camera module 100. The camera module 100 includes a universal camera part 105 and an interchangeable endcap part 110. The camera part 105 includes a lens assembly 115 and a lens assembly holder 118. The endcap part 110 includes mounting flanges 120 and a connector shroud 125. The mounting flanges 120 and a connector shroud 125 may be modified in accordance with the application. For example, the connector shroud 125 may be modified to accept an external connector 130. The circular design allows for numerous orientations and provides universal mounting for multiple vehicle platforms, for example.

Figure 2:
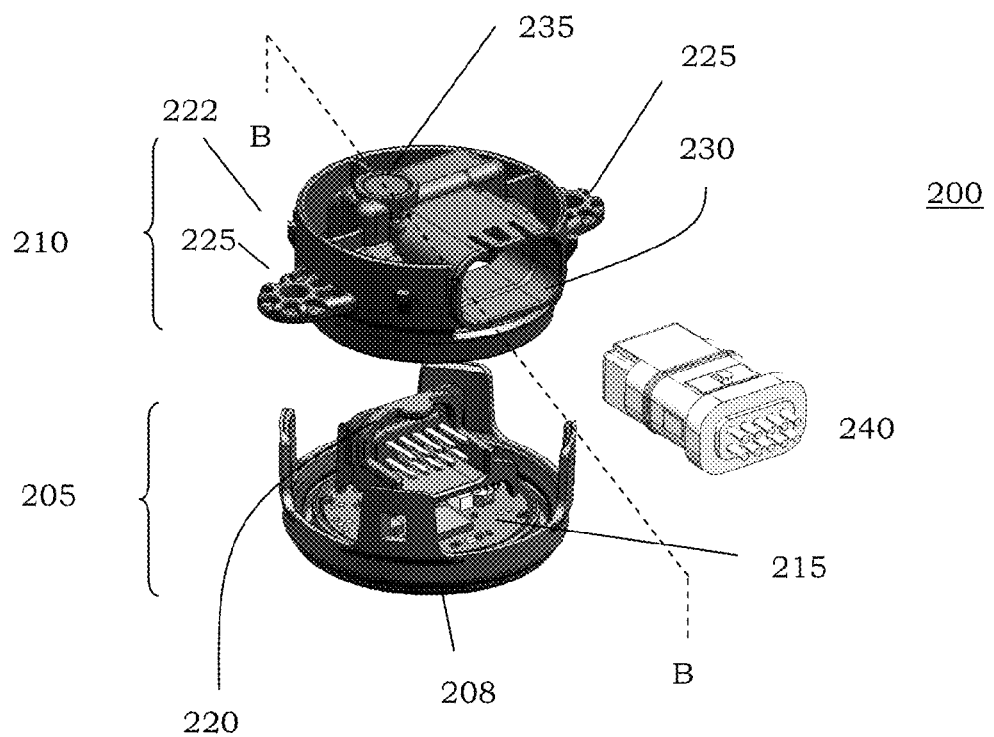
FIG. 2 is an embodiment of a partially assembled two part camera module.

FIG. 2 shows a partially assembled two part camera module 200. The camera module 200 includes a camera part 205 and an endcap part 210. The camera part 205 includes a lens assembly (not shown) and lens assembly holder 208 and a camera or image capturing chip or device mounted on a printed circuit board (PCB) 215. The PCB 215 with image sensing microchip is placed onto the lens assembly holder 208 with heat activated glue in-between. The positioning is done by computer numerical control (CNC) machinery so that it is precisely aligned to a lens assembly (not shown). The glue is then cured to maintain this alignment. A terminal block 220 is positioned on one side of the PCB 215 and is moveably connected to the PCB 215. The endcap part 210 includes an endcap 222, mounting elements 225 and a connector shroud 230 as described herein above. The endcap part 210 may also include a vent 235 that is used for pressure relief. The connector shroud 230 and mounting elements 225 vary in view of the particular mounting and connector environment. An external connector 240 connects to the terminal block 220 through the connector shroud 230. The endcap part 210 may be changed or adapted for different connectors and mountings.

Figure 3:
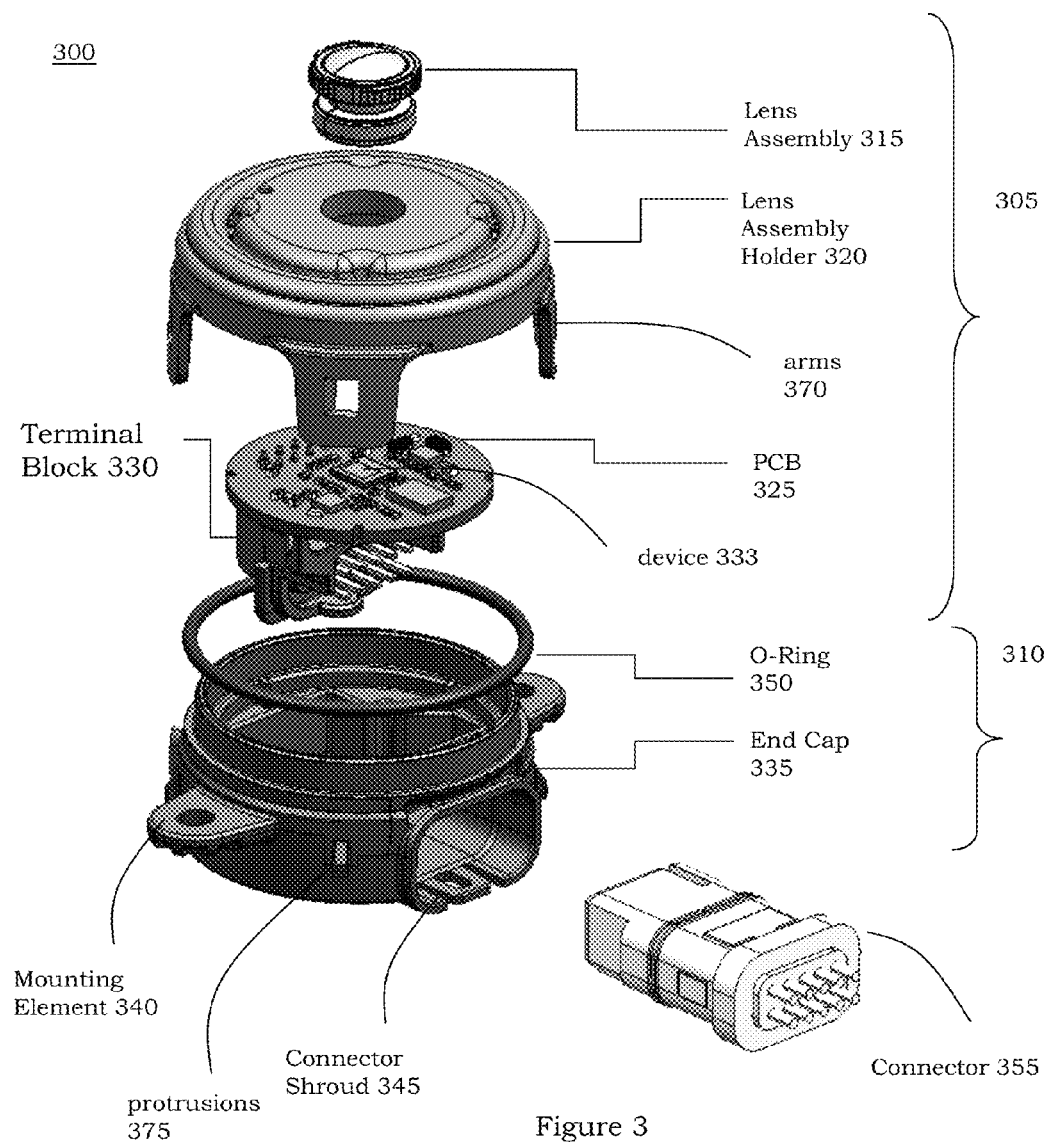
FIG. 3 is an exploded view of an embodiment of a two part camera module.

FIG. 3 shows an exploded view of a two part camera module 300 that includes a universal module 305 and an interchangeable module 310. A universal module 305 includes a lens assembly 315 that is screwed into a lens assembly holder 320, a printed circuit board (PCB) 325 and a terminal block 330. Focusing of the lens assembly 315 is accomplished by screwing the lens assembly 315 in and out of the lens assembly holder 320. The PCB 325 includes an image capturing device 333. The interchangeable module 310 includes an endcap 335 with mounting elements 340 and a connector shroud 345. An o-ring 350 is positioned between the universal module 305 and the interchangeable module 310 to provide a water tight seal when the two part camera module 300 is in an assembled state. The o-ring 350 provides a radial seal as opposed to an axial seal. A connector 355 is shown that connects to the terminal block 330 via the connector shroud 345.

The advantage of the radial seal is that the o-ring's sealing function depends on the robust circular shape of both the end cap 335 and lens assembly holder 320 for compression. An axial seal depends on the compression created by the attachment of the end cap 335 to the lens assembly holder 320. In this case, the attachment is facilitated by flexible snap arms 370 and protrusions 375 which provide 4 points of attachment. This may allow the housing to flex in the areas without attachment, providing reduced pressure against the seal in those locations.

In particular, the advantage in using a radial o-ring seal is that there is no stress caused by the o-ring on the snap arms 370 which hold the two halves of the module together. If an axial o-ring seal is used the snap arms 370 will be under constant stress because the o-ring is trying to push the two halves of the module apart, which over time will cause the snap arms 370 to deform and the seal integrity will be lost. In the case of an axial seal, a more robust and expensive connection method needs to be used to attach the two halves together, such as with multiple screws at close intervals, (even with the screws the seal will only be satisfactory near the screws since the plastic will tend to bend and deform in the areas between the screws and reduce the seals integrity over time).

On the other hand with a radial o-ring seal, the o-ring 350 is captured between two tubular surfaces where the structural shape of the parts is creating a seal which is not dependent on the method used to attach the two module halves together. The stress is equal through out the entire sealing surface and there are no weak areas that can deform and bend away from the o-ring 350. This means there is considerably more structural integrity when using a radial o-ring seal and the parts will remained sealed indefinitely.

Figure 4:
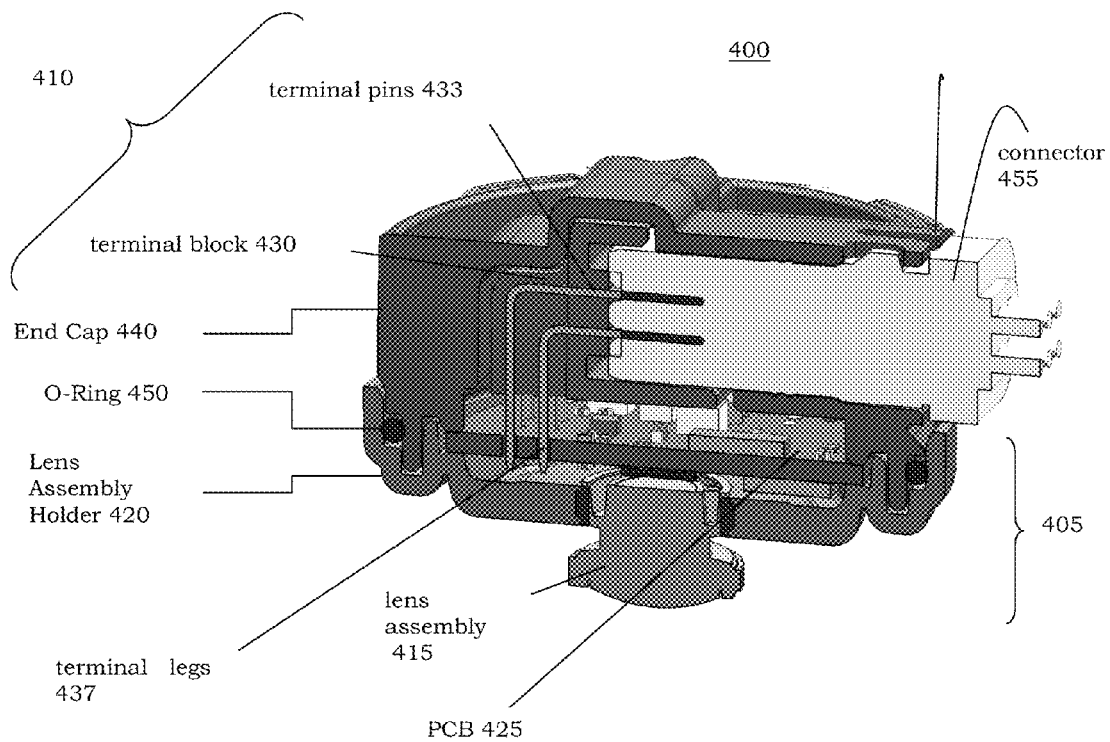
FIG. 4 is a cross sectional view of an embodiment of an assembled two part camera module.

FIG. 4 shows a cross sectional view of a two part camera module 400 taken along line A-A in FIG. 1. The two part camera module 400 includes a camera component 405 and a connector component 410. The camera component 405 includes a lens assembly 415 positioned in a lens assembly holder 420, a PCB 425, and a terminal block 430. The terminal block 430 has terminal pins 433 and terminal legs 437 moveably mounted on the PCB 425. The connector component 410 includes an endcap 440 and a connector shroud 445. An o-ring 450 sealably connects the camera component 405 and the connector component 410. The o-ring seal 450 provides a high quality stress free water tight seal and is a more reliable radial seal as compared to typical axial seals. An external connector 455 connects to terminal pins 433 through connector shroud 445.

Figure 5:
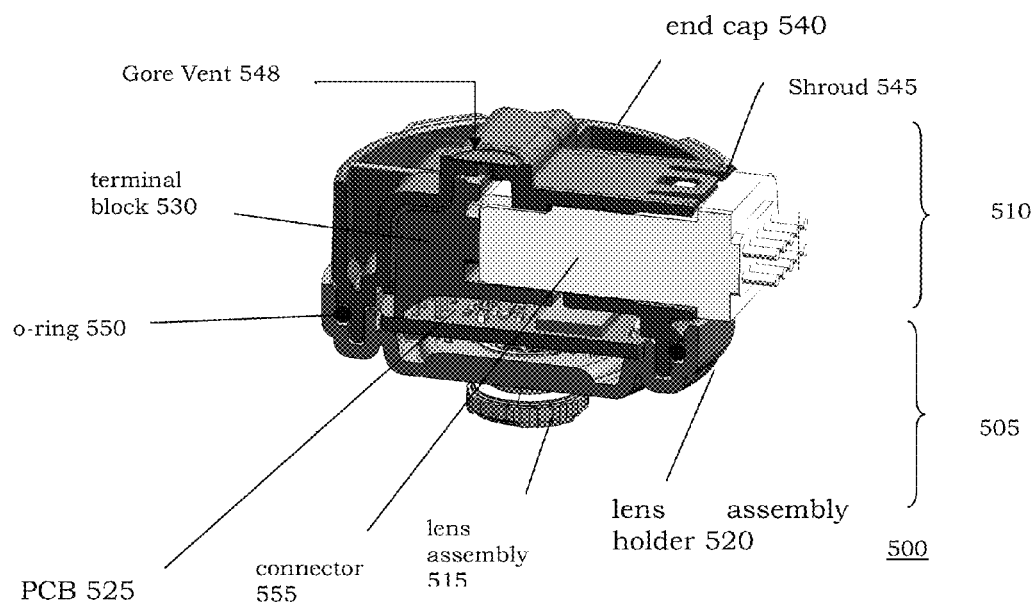
FIG. 5 is another cross sectional view of an embodiment of an assembled two part camera module with a gore vent.

FIG. 5 shows a cross sectional view of a two part camera module 500 taken along line B-B in FIG. 2. The two part camera module 500 includes a camera component 505 and a connector component 510. The camera component 505 includes a lens assembly 515 positioned in a lens assembly holder 520, a PCB 525, and a terminal block 530. The connector component 510 includes an endcap 540, a connector shroud 545 and a gore vent 548. The gore vent 548 eliminates pressure build-up in two part camera module 500. For example, a gore vent may be used that is permeable to air but not to liquids. An o-ring 550 sealably connects the camera component 505 and the connector component 510. The o-ring seal 550 provides a high quality stress free water tight seal and is a more reliable radial seal as compared to typical axial seals. An external connector 555 connects to terminal block 530 through connector shroud 545.

Figure 6:
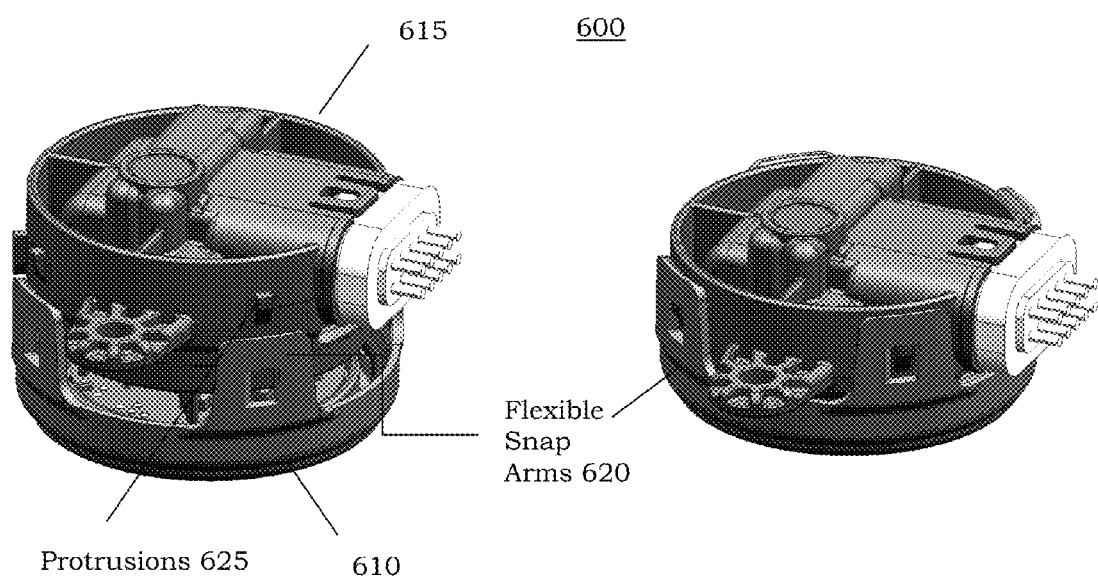
FIG. 6 shows an example fastening process for an embodiment of a two part camera module.

FIG. 6 shows an example fastening process 600 for a two part camera module. A two part camera module 605 includes a camera submodule 610 and an endcap submodule 615. The camera submodule 610 includes flexible snap arms 620 and the endcap submodule 615 includes protrusions 625. The flexible snap arms 620 snap fit with the protrusions 625 to connect together the camera submodule 610 and the endcap submodule 615. The snap assembly mechanism allows for a simpler assembly as opposed to glue or screw assemblies. Other snap assembly mechanisms may be used.

Figure 7:
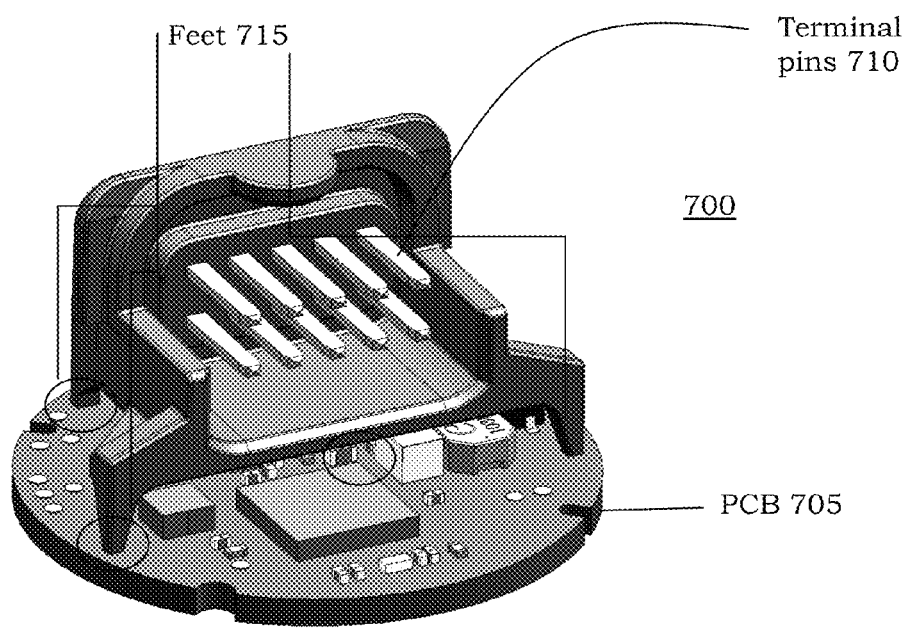
FIG. 7 shows a front view of an embodiment of a terminal block.
Figure 8:
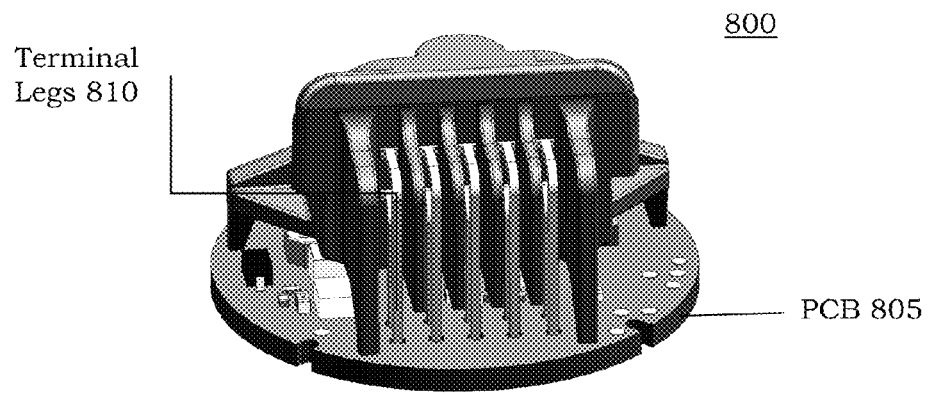
FIG. 8 shows a rear view of an embodiment of a terminal block.

FIGS. 7 and 8 show multiple views of a terminal block and PCB. FIG. 7 shows a front view of an example terminal block 700 mounted on PCB 705. The terminal block 700 has terminal pins 710 for connecting with a connector (not shown) and feet 715 for minimal surface contact with the PCB 705. FIG. 8 shows a rear view of the terminal block 800 mounted on a PCB 805. The terminal block 800 has terminal legs 810 for moveably connecting to the PCB 805. For example, the terminal legs 810 may be soldered to PCB 805 or other similar means may be used.

The terminal block 700 or 800 uses the terminal legs 810 and feet 715 to float or move across the PCB 705 or 805 surface to enable alignment. This will enable the body to move a small amount, (enough to align the terminal pins to the connector shroud on the endcap), after the terminal legs 810 have been soldered to the PCB 705 or 805. The terminal legs 810 may be metal or other materials suitable for terminals. The long flexible terminal legs 810 also ensure there is only minimal stress on the solder joints during movement.

Figure 9:
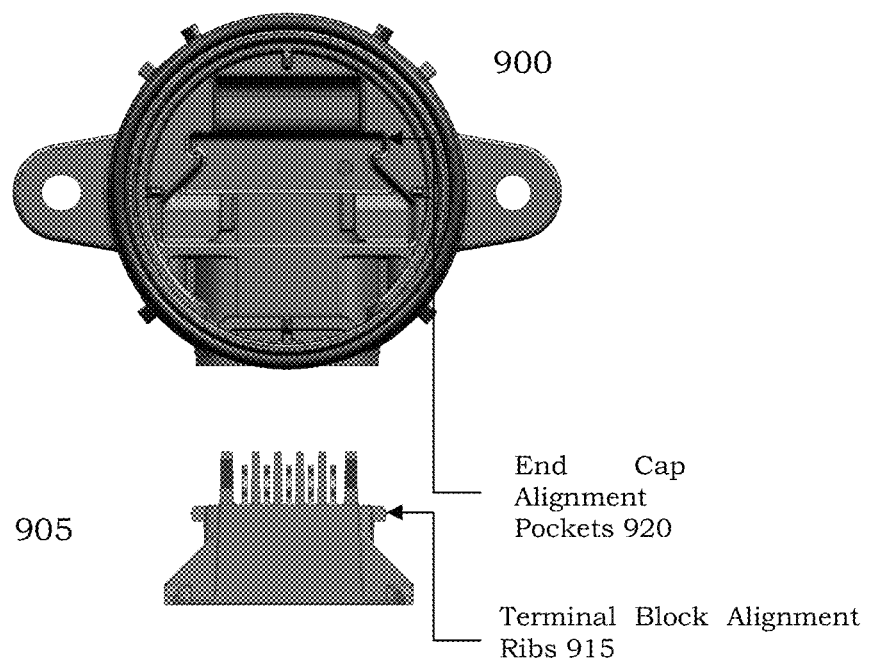
FIG. 9 shows an internal bottom view of an embodiment of an endcap and a bottom view of an embodiment of a terminal block.

FIG. 9 shows an internal bottom view of an endcap 900 and a bottom view of the terminal block 905. The endcap 900 aligns the terminal block 905 to an external connector and/or the connector shroud (neither shown). The terminal block 905 has alignment ribs 915 to guide it into endcap alignment pockets 920. The alignment ribs 915 will move the terminal block body across a PCB a small amount due to the features described herein above with respect to the terminal block construction. The alignment ribs 915 will also secure the terminal block 905 in the endcap 900, resisting connector insertion and removal forces acting upon on it.

Certain parts may be constructed from plastic or other lightweight moldable materials to reduce weight and cost. These are however non-limiting examples. Parts such as the lens barrel may be made from metal or other materials.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the camera module package described herein, and are considered to be within the full scope of the invention.

Although features and elements are described above in particular combinations, each feature or element can be used alone without the other features and elements or in various combinations with or without other features and elements.

What is claimed is:
1. A circular camera module, comprising:
 a circular universal first module including at least an image capture device; and
 a circular adaptable second module including mounting elements and a connector shroud, wherein the first module and the second module are configured to interconnect using a snap assembly,
wherein the first module and the second module are sealed against environmental conditions using a radially sealed o-ring.

2. The camera module of claim 1, wherein the mounting elements and the connector shroud are modified to connect with a device.

3. The camera module of claim 1, wherein the first module includes a lens assembly, a lens assembly holder, a printed circuit board (PCB) and a terminal block.

4. The camera module of claim 1, wherein the first module includes flexible snap arms and the second module includes corresponding protrusions.

5. The camera module of claim 1, wherein the second module further comprises a vent to mitigate internal gas build-up.

6. A circular camera device, comprising:
a circular camera component including at least an imager, wherein the camera component is used for multiple devices;
a circular connector component including mounting flanges and a connector shroud, wherein the connector component is adapted for different devices; and
an o-ring, wherein the o-ring is positioned between the circular camera component and circular connector component to radially seal the device against external contaminants.

7. The device of claim 6, wherein the camera component and connector component are configured to interconnect using a snap assembly mechanism.

8. The device of claim 6, wherein the mounting flanges and the connector shroud are adapted to connect with the different devices.

9. The device of claim 6, wherein the camera component includes a lens assembly, a lens assembly holder, a printed circuit board (PCB) and a terminal block.

10. The device of claim 6, wherein the camera component includes a first snap fit component and the connector component includes a matching snap fit component.

11. The device of claim 6, wherein the connector component further comprises a vent to mitigate internal gas build-up.

12. An imaging system, comprising:
a circular camera module configured to universally connect with multiple devices;
an interchangeable mated endcap component, wherein the endcap component is adapted for different devices; and
an o-ring, wherein the o-ring is positioned between the circular camera module and the interchangeable mated endcap component to radially seal the device against external contaminants.

13. The imaging system of claim 12, wherein the endcap component further comprises mounting elements and a connector shroud that are modified to connect with the different devices.

14. The imaging system of claim 12, wherein the circular camera module and the interchangeable mated endcap component are configured to interconnect using a snap assembly mechanism.

15. The imaging system of claim 12, wherein the circular camera module includes a lens assembly, a lens assembly holder, a printed circuit board (PCB) and a terminal block.

* * * * *